US012013858B2

(12) United States Patent
Erickson et al.

(10) Patent No.: US 12,013,858 B2
(45) Date of Patent: Jun. 18, 2024

(54) ASSOCIATING COMMENTS WITH TAGS IN A MANAGED HISTORIAN SYSTEM

(71) Applicant: AVEVA SOFTWARE, LLC, Lake Forest, CA (US)

(72) Inventors: Brian Kenneth Erickson, Long Beach, CA (US); Arun Kumar Nattamai Ramdoss, Mission Viejo, CA (US); Vinay T. Kamath, Rancho Santa Margarita, CA (US); Ravi Kumar Herunde Prakash, Lake Forest, CA (US); Abhijit Manushree, Laguna Niguel, CA (US)

(73) Assignee: AVEVA SOFTWARE, LLC, Lake Forest, CA (US)

(*) Notice: Subject to any disclaimer, the term of this patent is extended or adjusted under 35 U.S.C. 154(b) by 0 days.

(21) Appl. No.: 17/129,368

(22) Filed: Dec. 21, 2020

(65) Prior Publication Data
US 2021/0224278 A1 Jul. 22, 2021

Related U.S. Application Data

(63) Continuation of application No. 15/856,890, filed on Dec. 28, 2017, now Pat. No. 11,308,088.

(51) Int. Cl.
G06F 16/2455 (2019.01)
G06F 16/21 (2019.01)
G06F 16/22 (2019.01)
G06F 16/28 (2019.01)
G06F 16/95 (2019.01)

(52) U.S. Cl.
CPC ...... *G06F 16/24554* (2019.01); *G06F 16/219* (2019.01); *G06F 16/2255* (2019.01); *G06F 16/24568* (2019.01); *G06F 16/285* (2019.01); *G06F 16/95* (2019.01)

(58) Field of Classification Search
None
See application file for complete search history.

(56) References Cited

U.S. PATENT DOCUMENTS

| 6,421,571 | B1 * | 7/2002 | Spriggs | G05B 19/19 700/83 |
| 8,392,419 | B2 | 3/2013 | Heaton et al. | |
| 9,420,034 | B2 | 8/2016 | Cai et al. | |
| (Continued) | | | | |

OTHER PUBLICATIONS

William B. S. Pressly, Jr., "TSPad: A Tablet-PC Based Application for Annotation and Collaboration on Time Series Data", 2008, ACM ISBN 978-1-60558-105-7/08/03 (Year: 2008).

(Continued)

*Primary Examiner* — Polina G Peach
*Assistant Examiner* — Anugeetha Kunjithapatham
(74) *Attorney, Agent, or Firm* — Greenberg Traurig, LLP

(57) ABSTRACT

Associating comments with tags in a managed historian system in accordance with a flexible, platform-independent data structure. A worker role instance automatically associates received comments with a process tag at a particular time in response to receiving the comments. The worker role instance stores the comments in the flexible, platform-independent data structure such that the comment is provided in association with the tag at the particular time in response to a display or search request for the tag.

17 Claims, 10 Drawing Sheets

(56) References Cited

U.S. PATENT DOCUMENTS

| | | |
|---|---|---|
| 10,108,669 B1 | 10/2018 | Krishnamoorthy et al. |
| 2003/0177408 A1 | 9/2003 | Fields et al. |
| 2004/0210419 A1* | 10/2004 | Wiebe ................... F25B 49/005 |
| | | 702/182 |
| 2008/0071817 A1 | 3/2008 | Gaurav et al. |
| 2008/0077632 A1 | 3/2008 | Tysowski et al. |
| 2009/0006954 A1 | 1/2009 | Jackson et al. |
| 2010/0030995 A1* | 2/2010 | Wang ................... G06F 16/2282 |
| | | 711/E12.001 |
| 2010/0332510 A1 | 12/2010 | Gitai et al. |
| 2011/0307450 A1* | 12/2011 | Hahn ................... G06F 16/2282 |
| | | 707/769 |
| 2012/0215798 A1* | 8/2012 | Burris ................... G06F 16/951 |
| | | 707/755 |
| 2013/0054642 A1* | 2/2013 | Morin ................... G06F 16/248 |
| | | 707/E17.014 |
| 2015/0193477 A1 | 7/2015 | Dumant et al. |
| 2016/0210338 A1 | 7/2016 | Van Pelt et al. |
| 2016/0225059 A1* | 8/2016 | Chow ................. G06Q 30/0282 |
| 2016/0335373 A1* | 11/2016 | Burd ................. G06F 16/90335 |
| 2017/0242935 A1 | 8/2017 | Wragg et al. |
| 2018/0101419 A1* | 4/2018 | Rope ...................... G06F 9/542 |
| 2018/0113897 A1* | 4/2018 | Donlan ................ G06F 16/248 |
| 2018/0293284 A1* | 10/2018 | Shah ................... G06F 16/2477 |
| 2018/0300437 A1* | 10/2018 | Thomsen .......... G06F 16/24573 |

OTHER PUBLICATIONS

Luther et al., "Pathfinder: An Online Collaboration Environment for Citizen Scientists", 2009, ACM 978-1-60558-246-7/09/04 (Year: 2009).

* cited by examiner

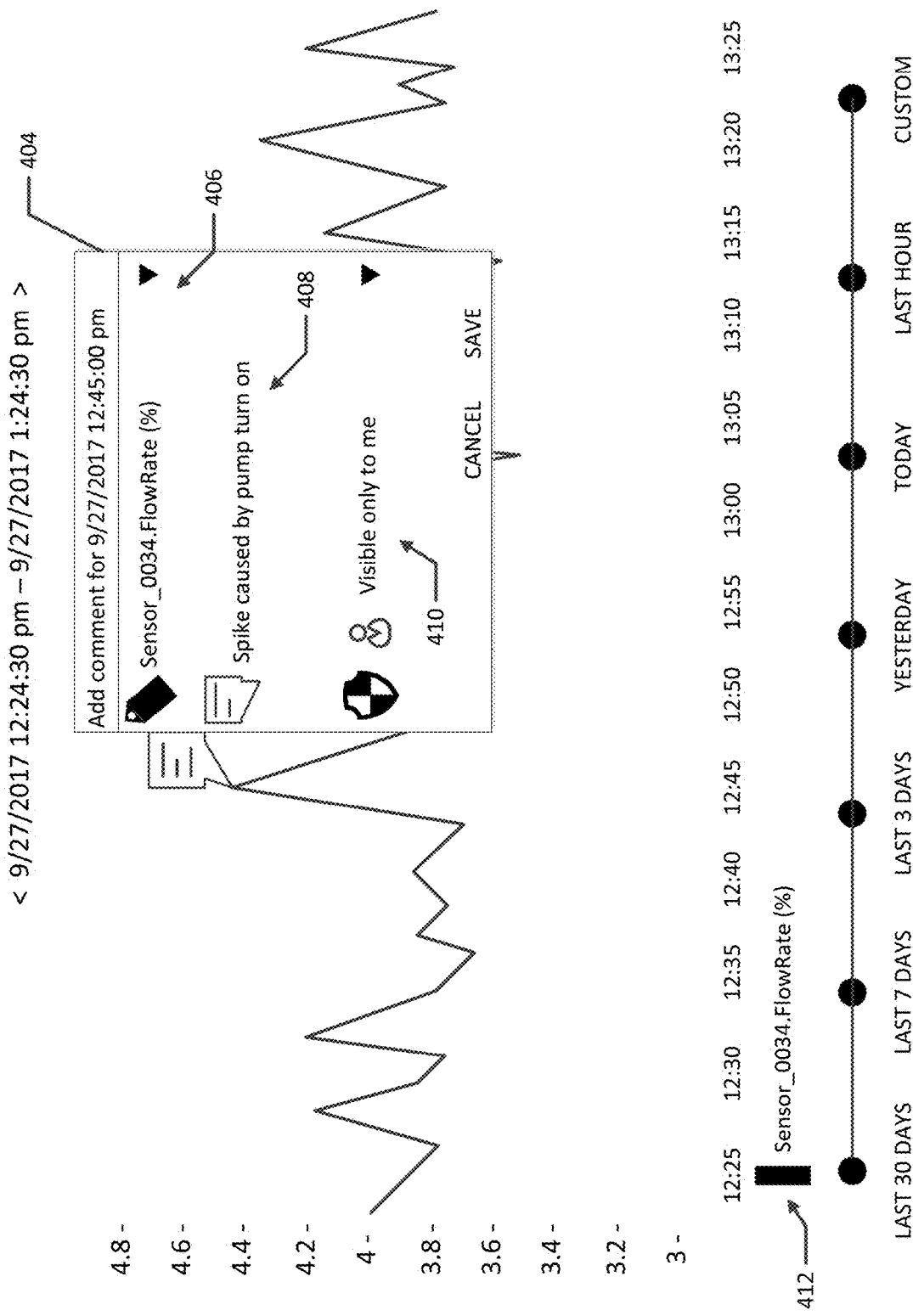

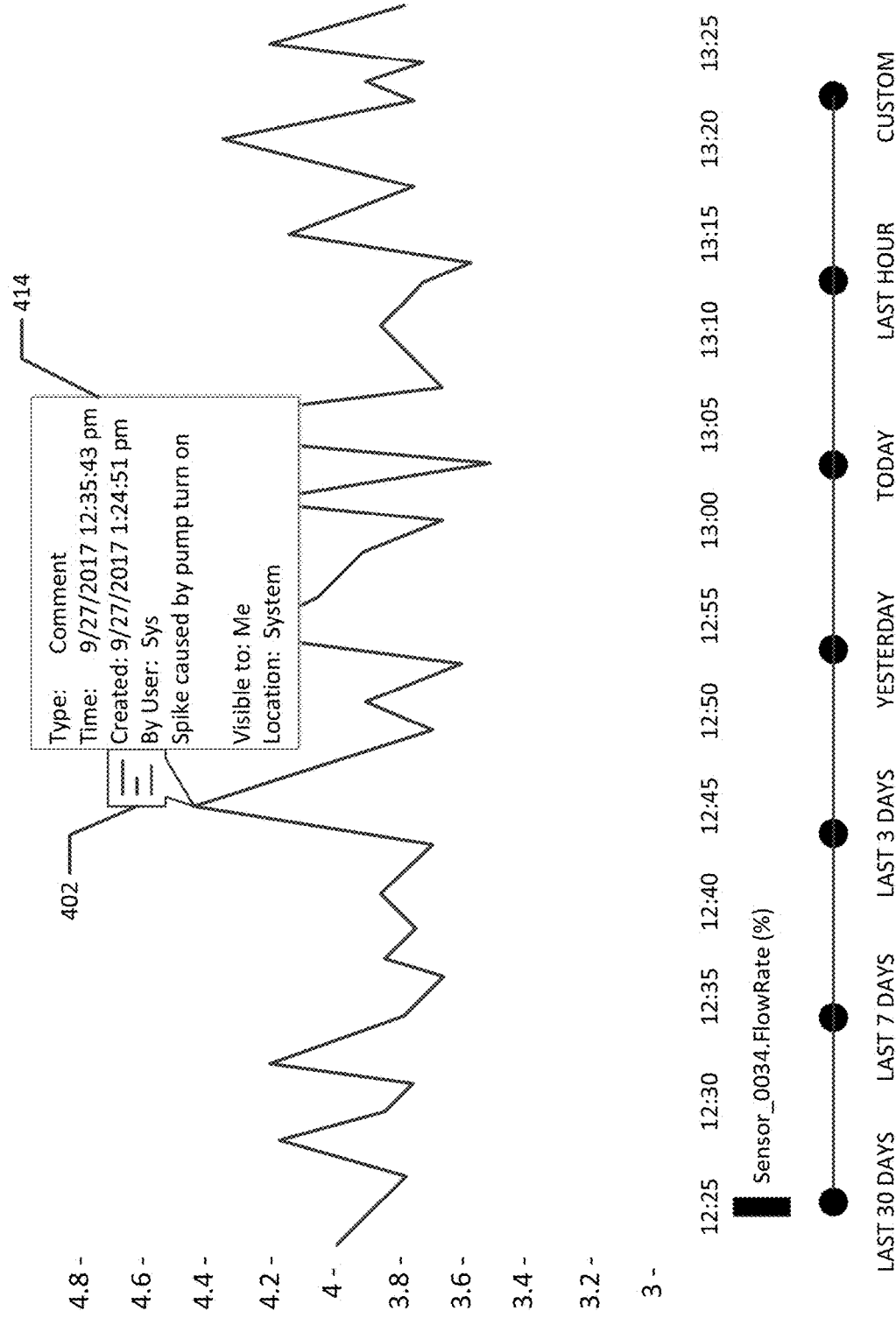

ASSOCIATING COMMENTS WITH TAGS IN A MANAGED HISTORIAN SYSTEM

CROSS REFERENCE

This application is a continuation of U.S. patent application Ser. No. 15/856,890, filed Dec. 28, 2017, the entire contents of which are incorporated by reference herein.

TECHNICAL FIELD

Aspects of the present disclosure generally relate to the fields of networked computerized industrial control, automation systems, networked computerized systems utilized to monitor, log, and display relevant manufacturing/production events and associated data, and supervisory level control and manufacturing systems. More particularly, aspects relate to systems and methods that associate comments with tag process values in a managed historian system.

BACKGROUND

Managed historians utilize cloud computing environments to provide a multi-tenant software-as-a-service solution for storing and enabling access to historical data, such as time-series data for example, relating to continuous processes and their associated outputs. When the historical data is displayed on a display device (e.g., as a line chart, etc.), the data values at a particular time may abnormally visually differ from the data values at other times. For example, the abnormality may be a spike, a rate, and the like. Understanding reasons for the abnormality and/or other properties of the abnormality helps optimize operation of the continuous process. Conventional techniques require that process personnel record notes about the abnormality on a medium unrelated to the storage and visual display of the historical data (e.g., a notebook, a separate digital document, etc.). Other conventional techniques permit notes on a report comprised of multiple historical data tags. These techniques fail to facilitate understanding of the particular underlying aspect of the continuous process corresponding to the abnormality and also fail to enable communication among process personnel, for example.

SUMMARY

Aspects of the present disclosure associate comments with tags in a managed historian system in accordance with a flexible, platform-independent data structure. A worker role instance automatically associates received comments with a process tag at a particular time in response to receiving the comments. The worker role instance stores the comments in the flexible, platform-independent data structure such that the comment is provided in association with the tag at the particular time in response to a display or search request for the tag.

In an aspect, a managed historian of a distributed historian system includes at least one historian processor, a database storage account, and at least one computer-readable storage medium. The historian processor is communicatively coupled, via a communications network, to the database storage account, the computer-readable medium, one or more data collectors within a continuous process, and one or more user computing devices. The database storage account stores process tags that represent an attribute of the continuous process with a value that is variable over a time range. Exemplary and non-limiting attributes include physical properties of valves, sensors, pumps, tanks, and the like within the continuous process. The computer-readable storage medium stores processor-executable instructions that, when executed by the historian processor, instantiate a worker role instance. The executing worker role instance is configured to receive a comment describing the value of at least one tag of the plurality of tags at a particular time within the time range of the tag. The worker role instance receives the comment from a first user computing device of the one or more user computing devices while the tag is displayed on the first user computing device. The executing worker role instance is further configured to associate the received comment with the tag at the particular time and store the received comment in a flexible data structure in the database storage account. In this manner, the managed historian stores the comment such that it is provided in association with the tag at the particular time in response to a display request for the tag from the one or more user computing devices.

In other aspects, a computer implemented method is provided.

Other objects and features will be in part apparent and in part pointed our hereinafter.

BRIEF DESCRIPTION OF THE DRAWINGS

FIGS. 4A-4C and 5 are each diagrams illustrating exemplary graphical user interfaces of the historian system of FIG. 1.

Corresponding reference characters indicate corresponding parts throughout the drawings.

DETAILED DESCRIPTION

Figure 1A:
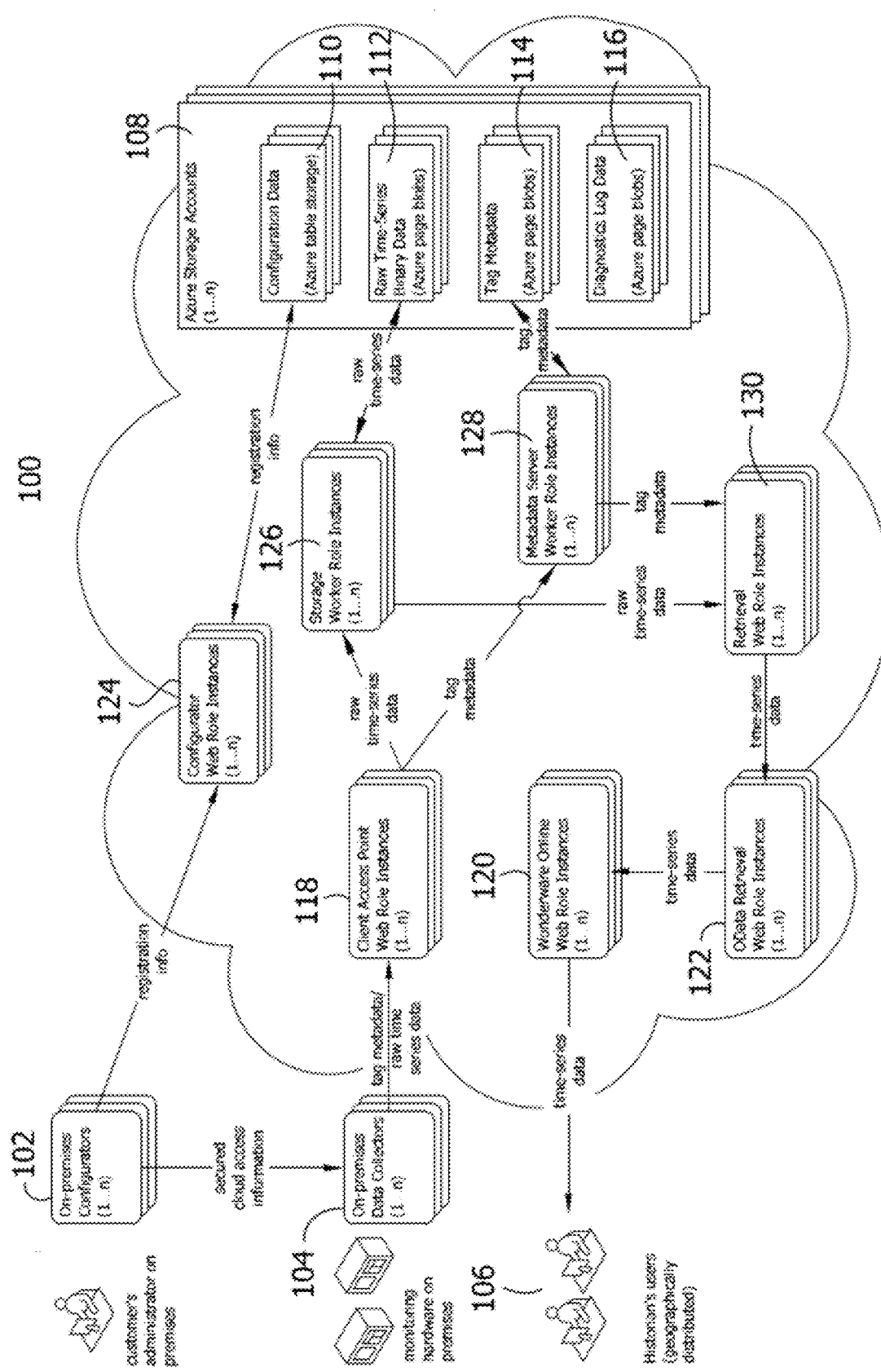
FIGS. 1A, 1B, and 2 each illustrate aspects of an architecture of an exemplary historian system according to an embodiment.

Referring to FIG. 1A, a distributed historian system, generally indicated at 100, is configured to store time-series data in a managed historian and enable users to access the data, even if the data is stored in different data sources. The historian system 100 is configured to store and use data from various locations and facilities and use cloud storage technology (e.g., cloud computing environment 103) to ensure that all the facilities are connected to all the necessary data. The system 100 forms connections with configurators 102, data collectors 104, and user computing devices 106 on which the historian data can be accessed. The configurators 102 are computer-executable modules that may be used by system administrators to configure the functionality of the historian system 100. The data collectors 104 are computer-executable modules that connect to and monitor hardware in the process control system to which the historian system 100 is connected. The data collectors 104 and configurators 102 may be at different locations throughout the process control system. The user computing devices 106 comprise computing devices that are geographically distributed, enabling historian data from the system 100 to be accessed from various locations across a country or throughout the world.

In an embodiment, historian system 100 stores a variety of types of data in storage accounts 108. This data includes configuration data 110, raw time-series binary data 112, tag metadata 114, and diagnostic log data 116. In an embodiment, raw time-series binary data comprises a tag that includes a value of a property within the continuous process at a particular time. In accordance with an embodiment of the disclosure, historian system 100 is further configured to store comments in storage accounts 108, as further described herein. The storage accounts 108 may be organized to use table storage or other configuration, such as page blobs. The historian system 100 implements one or more execution roles, such as instances of web roles and/or instances of worker roles. A web role is a cloud execution service configured to execute web applications that are supported by Internet Information Services (IIS). A worker role is a cloud execution service configured to execute applications and service-level tasks, which generally do not require IIS support.

The historian system 100 is accessed via web role instances in an embodiment. As shown, configurators 102 access configurator web role instances 124. And data collectors 104 access client access point web role instances 118. Online web role instances 120 are accessed by the user computing devices 106. The configurators 102 share configuration data and registration information with the configurator web role instances 124. The configuration data and registration information is stored in the storage accounts 108 as configuration data 110. The data collectors 104 share tag metadata and raw time-series data with the client access point web role instances 118. The raw time-series data is shared with storage worker role instances 126 and then stored as raw time-series binary data 112 in the storage accounts 108. The tag metadata is shared with metadata server worker role instances 128 and stored as tag metadata 114 in the storage accounts 108. The storage worker role instances 126 and metadata server worker role instances 128 send raw time-series data and tag metadata to retrieval worker role instances 130. The raw time-series data and tag metadata is converted into time-series data and sent to the online web role instances 120 via data retrieval web role instances 122. Users using the user computing devices 106 receive the time-series data from the online web role instances 120.

Figure 1B:
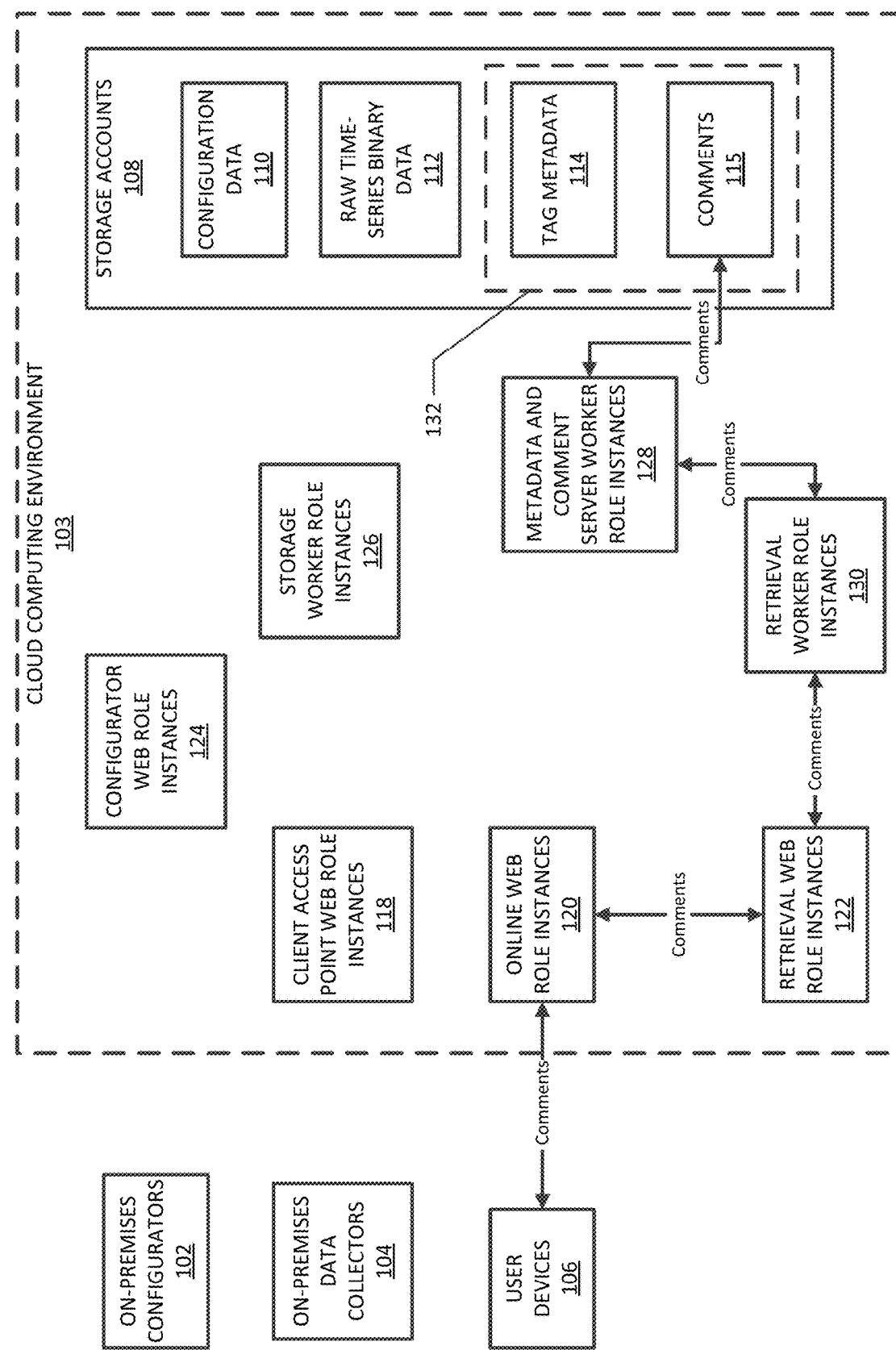

FIG. 1B illustrates an embodiment of distributed historian system 100 configured to receive and store comments 115 that each describe one or more aspects of a tag value (e.g., the value of the tag at a particular time). For example, comments 115 may include user feedback, opinions, reactions, observations, reasons, commentary, explanations, annotations, hashtags, hyperlinks, attachments, and the like. In an exemplary embodiment, a comment 115 explains the underlying cause within the continuous process for an abnormality (e.g., spike) at a particular time for a tag value. In an embodiment, the tag metadata 114 and comments 115 are stored in a database 132 (e.g., a distributed, multi-model database, such as Cosmos DB) within the storage accounts 108. As further described herein, comments 115 may be secured via access rights or the like and comments 115 may be shared among user computing devices 106.

The user computing devices 106 include associated display devices capable of displaying graphical representations of data (e.g., metadata, time-series data, tag values, etc.), via a graphical user interface (GUI), regarding aspects of a continuous industrial process. For example, the display devices may be a touchscreen of a mobile computing device (e.g., smartphone, tablet computing device, laptop computing device) or a monitor of a desktop computing device. While displaying a graphical representation of the values of at least one tag, user computing devices 106 are configured to receive a user selection of the value of the tag at a particular time. Upon selection, user computing devices 106 display a GUI that is configured to receive a comment 115 from a user about the value of the selected tag at the selected time. In an embodiment, the value of the selected tag at the selected time is anomalous and the comment 115 explains the underlying reason for the anomalous value at that particular time. For example, the comment 115 may include a textual description, an image description, a hyperlink, and/or an attached document for display by another user computing device 106. Additionally or alternatively, the comment 115 includes a hashtag value to enable another user computing device 106 to search for the comment. Although embodiments described herein refer to comments for anomalous tag values, one of ordinary skill in the art will understand that associating comments with any tag value, regardless of its relationship to other tag values, is within the scope of the present disclosure.

The user computing devices 106 are further configured to transmit received comments 115 to the retrieval worker role instances 130 via the online web role instances 120 and retrieval web role instances 122. The retrieval worker role instances 130 are configured to associate the received comments 115 with the value of the selected tag at the selected time and store the received comments 115 in the database 132 within storage accounts 108. In an embodiment, the database 132 is a Cosmos DB that provides a flexible, platform-independent data structure for the comments 115. Additionally or alternatively, the comments 115 are exposed as representational state transfer (REST) application programming interfaces (APIs) and utilize dynamic modeling.

The user computing devices 106 are further configured to retrieve comments 115 in response a display request and/or a search request. In an embodiment, a user computing device 106 requests the display of time-series data comprising a particular tag. When retrieving the data for the request, retrieval worker role instances 130 retrieve any comments 115 associated with the requested tag and provide them to the requesting user computing device 106. In another embodiment, a user computing device 106 requests the display of comments 115 including certain content (e.g., a certain term, a hashtag value, etc.). Upon receiving the search request, retrieval worker role instances 130 retrieve all comments 115 including the certain content and provide them to the requesting user computing device 106.

Figure 2:
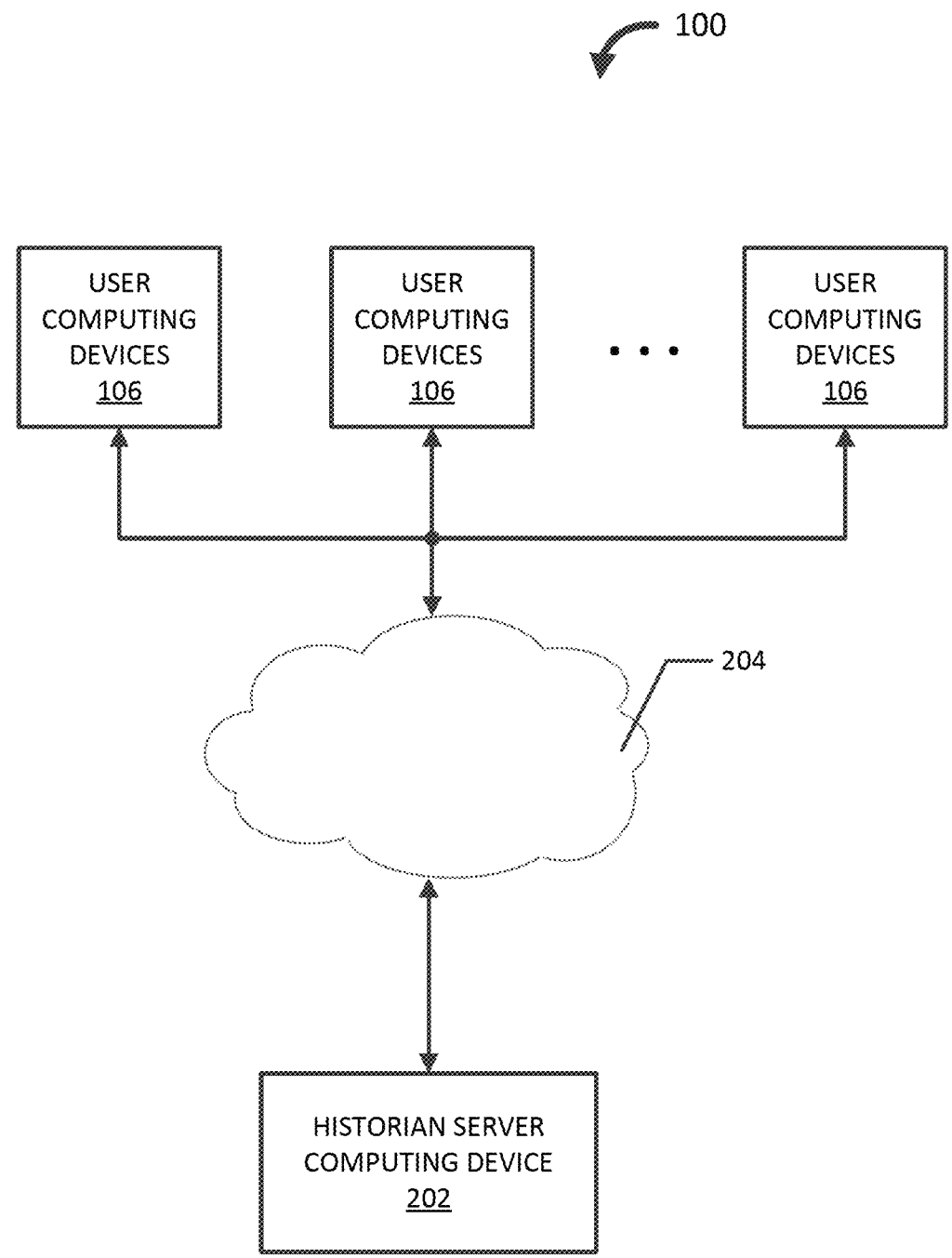

FIG. 2 illustrates aspects of historian system 100 from a slightly different perspective. As illustrated in FIG. 2, one or more user computing devices 106 are communicatively coupled to a historian server computing device 202 via a communications network 204. Although illustrated in FIG. 2 as a single device, one of ordinary skill in the art will understand that historian server computing device 202 may comprise one or more server computing devices communicatively coupled and forming a cloud computing environment, such as Microsoft Azure for example. In an embodiment, the storage accounts 108 and data therein are stored on computer-readable storage devices (e.g., memory) of historian server computing device 202 and the web role instances (e.g., client access point web role instances 118, online web role instances 120, data retrieval web role instances 122, configurator web role instances 124, storage worker role instances 126, metadata server worker role instances 128, retrieval worker role instances 130, etc.) execute on a processor of historian server computing device 202.

As described above, the user computing devices 106 are configured to receive and display data stored on historian server computing device 202. Exemplary user computing devices include, but are not limited to, tablet computing devices, smartphones, laptop computing devices, desktop computing devices, workstations, and the like.

The communications network 204 is capable of facilitating the exchange of data among various components of historian system 100, including user computing devices 106 and historian server computing devices 202. The communications network 204 in the embodiment of FIG. 2 includes a wide area network (WAN) and/or a local area network (LAN) that is connectable to other telecommunications networks, including other WANs, LANs, and/or portions of the Internet or an intranet. The communications network 204 may be any telecommunications network that facilitates the exchange of data, such as those that operate according to the IEEE 802.3 (e.g., Ethernet) and/or the IEEE 802.11 (e.g., Wi-Fi) protocols, for example. In another embodiment, communications network 204 is any medium that allows data to be physically transferred through serial or parallel communication channels (e.g., copper wire, optical fiber, computer bus, wireless communication channel, etc.). In an embodiment, communications network 204 comprises at least in part a process control network. In another embodiment, communications network 204 comprises at least in part a supervisory control and data acquisition (SCADA) system. In yet another embodiment, communications network 204 comprises at least in part an enterprise manufacturing intelligence (EMI)/operational intelligence (OI) system.

Figure 3:
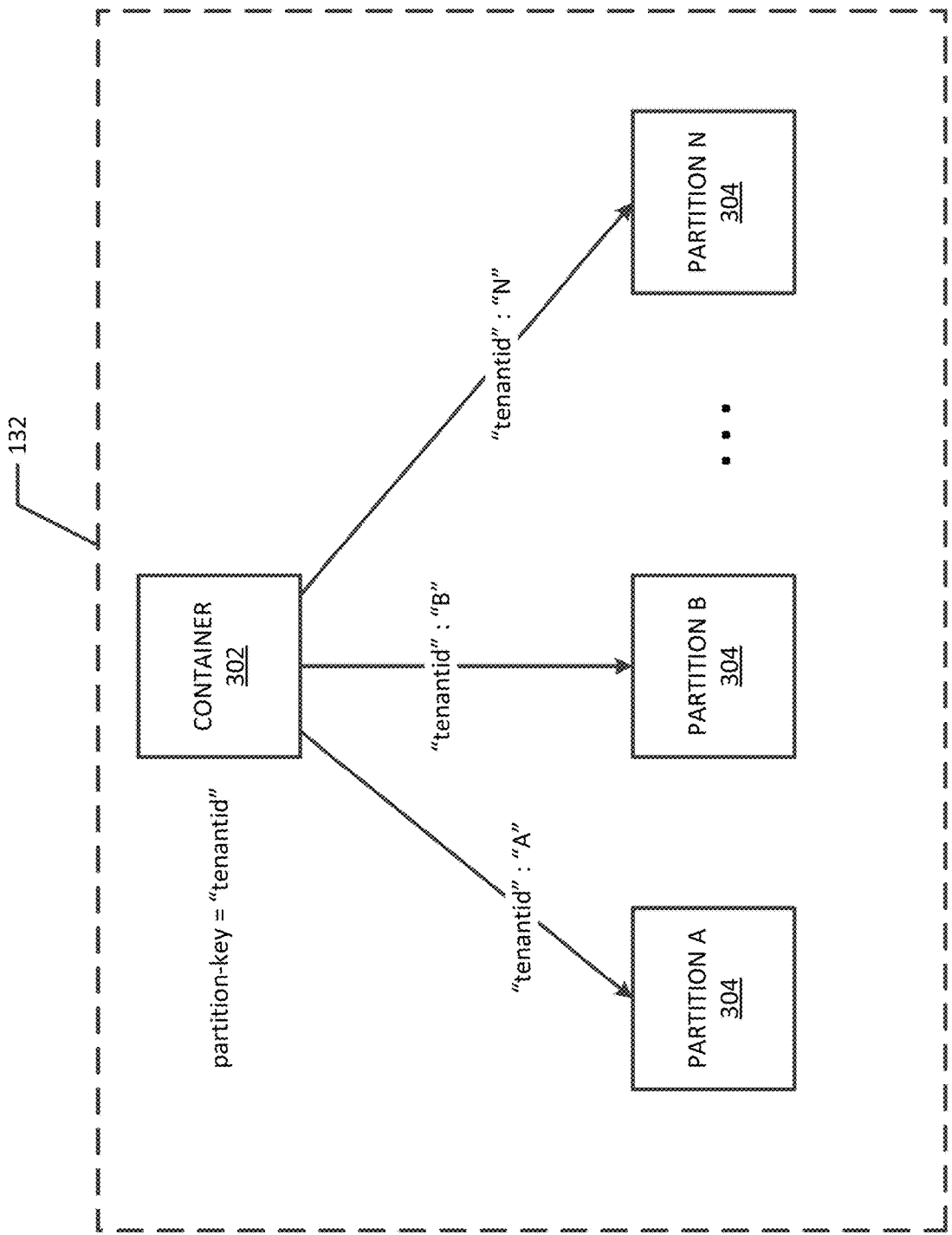
FIG. 3 illustrates an exemplary database of the historian system of FIG. 1.

FIG. 3 illustrates an exemplary embodiment of database 132. In an aspect, database 132 enables storing and querying schema-less data and this flexible, platform-independent data structure enables distributed historian system 100 to store additional values with comments 115. As illustrated in FIG. 3, database 132 includes one or more containers 302 for storing comments 115. The containers 302 are logical resources for storing data (e.g., collections, graphs, and/or tables) and may span one or more physical partitions (e.g., server computing devices) 304. In an embodiment, database 132 determines the number of partitions 304 based on the storage size of each partition and the throughput of container 302. In an embodiment, database 132 also stores tag metadata 114, including fixed and/or extended properties, as described in U.S. patent application Ser. No. 14/833,906, which is hereby incorporated by reference in its entirety.

In an embodiment, distributed historian system 100 includes one database 132 account per environment that stores both tag metadata 114 and comments 115. A new partitioned collection is created in database 132 for storing comments 115. In an embodiment, distributed historian system 100 creates one collection per tenant group (TG). Each collection is configured to store an unlimited amount of data and each partition 304 is configured to store a maximum of 10 gigabytes of data in accordance with one or more embodiments of the disclosure. In an embodiment, the collections are allocated with 1000 request units (RU) per second and may be scaled based on the number of requests (e.g., load).

The database 132 utilizes hash-based partitioning in accordance with an aspect of the disclosure. In an exemplary embodiment, container 302 includes a partition key of "tenantid". When a comment 115 is added to distributed historian system 100, database 132 hashes the partition key value (e.g., "tenantid": "A", "tenantid": "B", etc.) of the comment 115 and determines in which partition 304 to store the comment based on the hashed result. In an embodiment, database 132 stores all comments 115 having the same partition key in the same physical partition 304. In the exemplary embodiment illustrated in FIG. 3, comments 115 are partitioned based on the value of the "tenantid" key (i.e., one partition 304 is allocated per tenant). As further described herein, the REST API of database 132 is exposed to add, update, delete, and retrieve comments 115 in accordance with an embodiment of the disclosure.

Figure 4A:
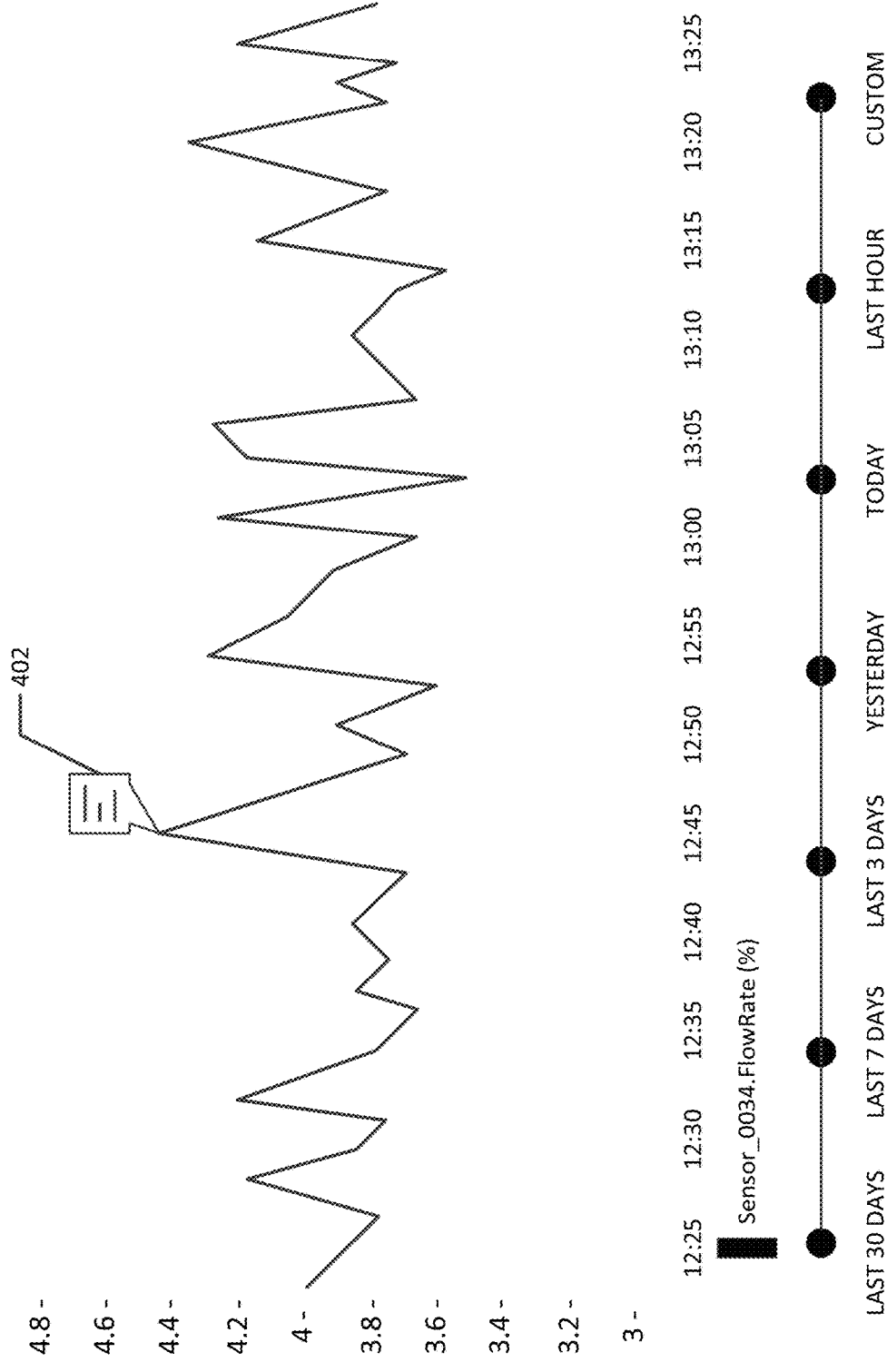

FIGS. 4A-4C illustrate an exemplary process of adding and retrieving comments 115 via a GUI displayed on a display device of user computer devices 106. Referring to FIG. 4A, a user computing device 106 displays a GUI including a line chart visually representing a value of a sensor flow tag that is variable over a time range. A user selects the graphical representation of the tag at a particular time (e.g., a point in time) with a comment icon 402.

In response, the user computing device 106 displays, via the GUI, a comment addition interface 404 as illustrated in FIG. 4B. The comment addition interface 404 includes a tag dropdown 406, a comment field 408, and a security dropdown 410. From the tag dropdown 406, the user selects the tag to which the comment will be associated. In the illustrated embodiment, the GUI displays a single tag but one of ordinary skill in the art will understand that the GUI may display a visual representation of a plurality of tags variable over a time range and the user may select one of the visually represented tags from the tag dropdown 406. In an embodiment in which the GUI displays a visual representation of a plurality of tags, each tag may have individually identifying properties (e.g., line color, line dash, etc.) to distinguish the tags. In an embodiment, the GUI includes a legend 412 explaining which identifying properties are associated with a particular tag.

After selecting a tag, the user enters information into the comment field 408 about the value of the selected tag at the selected time. For example, the information may be in the form of a textual description, an image, a hyperlink, an attached document, or the like. The entered information of the comment may include user feedback, opinions, reactions, observations, reasons, commentary, explanations, annotations, hashtags, hyperlinks, attachments, and the like, for example.

From the security dropdown 410, the user specifies who can view this comment. The security setting of comments can be set to private or team. A private comment may only be viewed, edited, and deleted by the user who created it. A team comment may be shared with other users based on a location security of the tag. Once set to be shared via the team setting, users belonging under that location or having access to the tag are able to view (e.g., via user computing devices 106) the shared comment. Once comments are shared with team members, each team member will be aware of the information regarding the tag value (e.g., the reason for an anomalous value, etc.), which is used to optimize operation of the continuous process. In an embodiment, a user may add a comment as long as the user has access to the underlying tag, including any gaps in the chart. In another embodiment, multiple comments for the same date time stamp may be added by the same user who created the comment or by a different user who has team access privileges. In accordance with one or more embodiments, users are unable to add comments when accessing tags anonymously.

After entering values and information via the comment addition interface 404, the user can cancel (e.g., discard) or save the comment. Upon receiving a save indication, the information and values entered via comment addition interface 404 comprise a comment 115. The user computing device 106 is configured to then transmit the comment 115 to the retrieval worker role instances 130, which associates the comment 115 with the value of the tag at the selected time and stores the comment 115 in the database 132, as further described herein.

The user computing devices 106 are also configured to retrieve the comment 115, as further described herein. When a user computing device 106 displays the GUI including the line chart visually representing the value of the sensor flow tag, the visual representation includes the comment icon 402 at the point in time corresponding to comment 115. Upon receiving a selection of comment icon 402 from the user, the user computing device 106 retrieves the comment 115 represented by the comment icon 402. Upon retrieving the comment 115, the user computing device 106 is configured to display the comment 115 via a comment interface 414 of the GUI, as illustrated in FIG. 4C.

Figure 5:
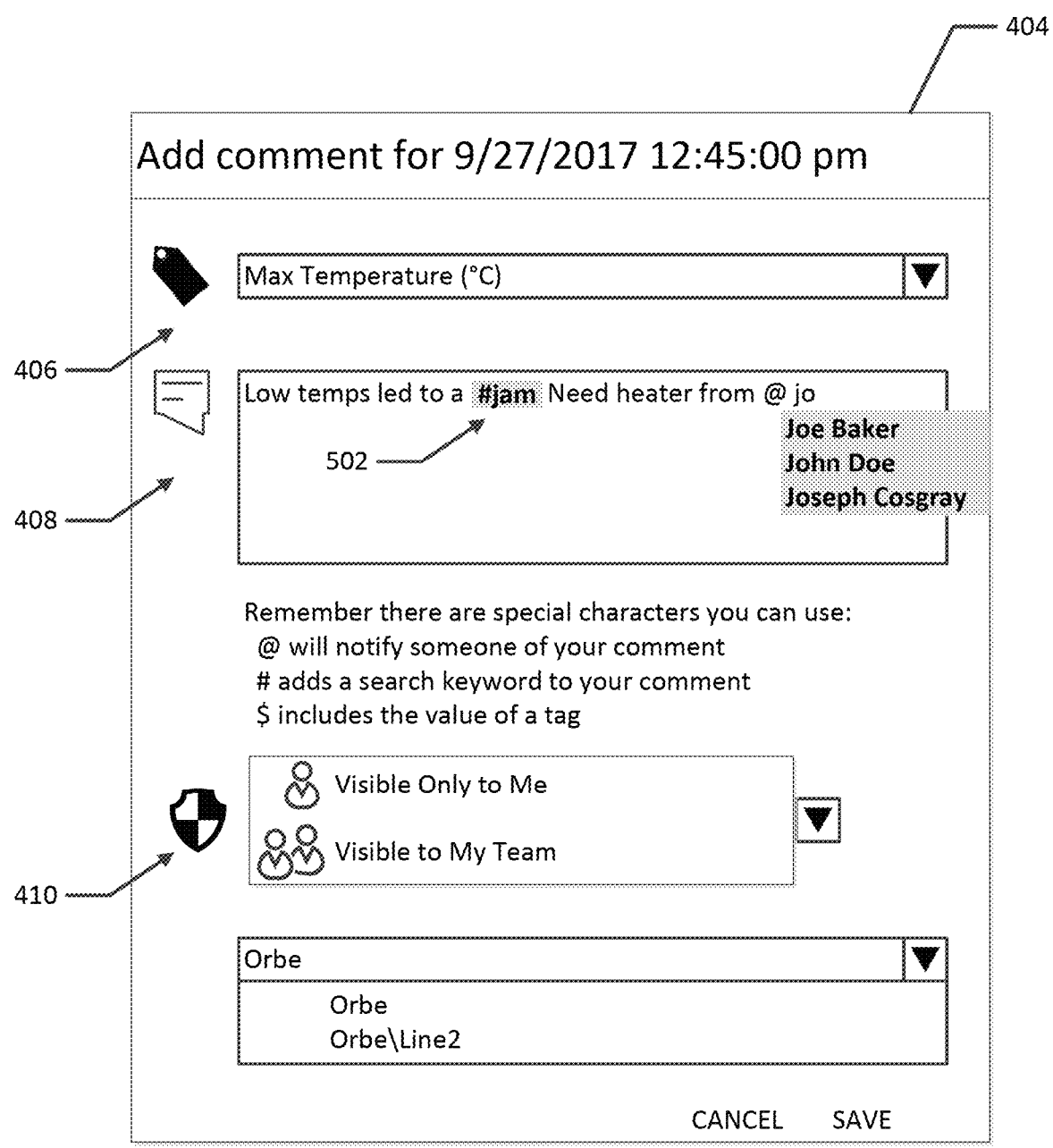

FIG. 5 illustrates an alternative exemplary embodiment of comment addition interface 404. The textual information entered in comment field 408 includes a hashtag value (e.g., keyword) 502. In an embodiment, including a hashtag symbol (e.g., #) before a term will make the term a hashtag value 502, which enables searching for the comment by the hashtag value 502 from a search bar displayed via a GUI on user computing devices 106 comprising a historian interface system. Further details regarding historian interface systems are provided in, for example, U.S. patent application Ser. No. 14/966,195, which is hereby incorporated by reference in its entirety.

As further illustrated in FIG. 5, the textual information entered in comment field 408 includes a user notification 504. In an embodiment, including an "at" symbol (e.g., @) before a term identifying a user will make the term a user notification 504. Upon saving the comment including a user notification 504, distributed historian system 100 is configured to transmit a notification (e.g., alert, email, text message, pop-up, etc.) to a user computing device 106 associated with the user identified in the user notification 504. In another embodiment, the textual information entered in comment field 408 may include a tag identifier. For example, including a dollar symbol (e.g., $) before a term identifying a tag will make the term a tag identifier.

Figure 6:
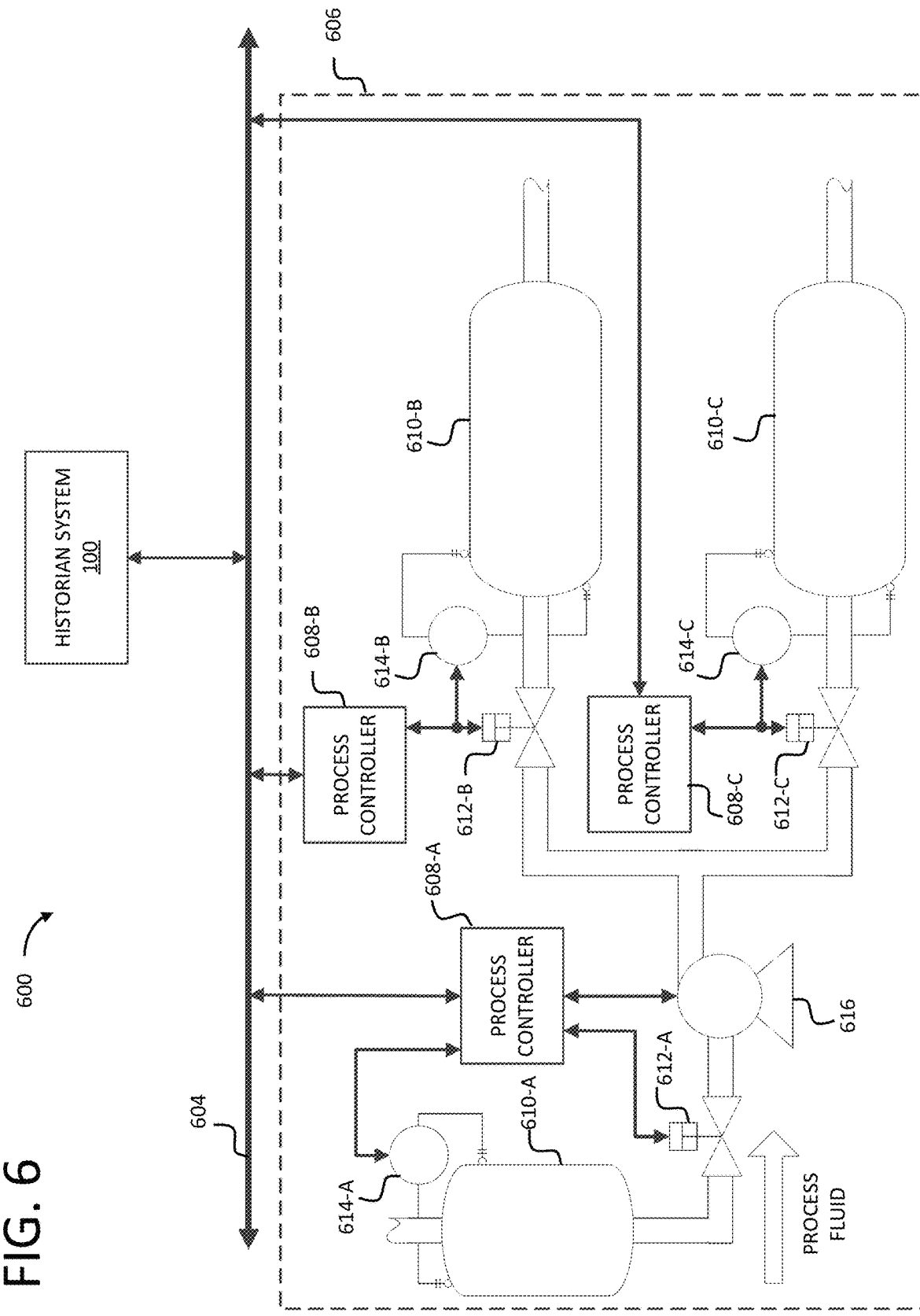
FIG. 6 illustrates an exemplary industrial process system within which aspects of the disclosure are incorporated according to an embodiment.

FIG. 6 illustrates an exemplary system, generally indicated at 600, within which an embodiment of the disclosure may be incorporated. The system 600 includes the historian system 100, a communications infrastructure 604, and an exemplary plant, such as a fluid processing system 606. As illustrated, the fluid processing system 606 includes process controllers 608, tanks 610, valves 612, sensors 614, and a pump 616. In an embodiment, the historian system 100, the communications infrastructure 604, the process controllers 608, and the sensors 614 comprise at least in part a process control network, a SCADA system, and/or an EMI/OI system. In system 600, historian system 100, process controllers 608, the tanks 610, the valves 612, sensors 614, and the pump 616 are communicatively coupled via communications infrastructure 604.

The communications infrastructure 604 is capable of facilitating the exchange of data among various components of system 600, including historian system 100 and components of fluid processing system 606 (e.g., process controllers 608, valves 612, sensors 614, etc.). In an embodiment, communications infrastructure 604 comprises communications network 204. The communications infrastructure 604 in the embodiment of FIG. 6 includes a local area network (LAN) that is connectable to other telecommunications networks, including other LANs or portions of the Internet or an intranet. The communications infrastructure 604 may be any telecommunications network that facilitates the exchange of data, such as those that operate according to the IEEE 802.3 (e.g., Ethernet) and/or the IEEE 802.11 (e.g., Wi-Fi) protocols, for example. In another embodiment, communications infrastructure 604 is any medium that allows data to be physically transferred through serial or parallel communication channels (e.g., copper wire, optical fiber, computer bus, wireless communication channel, etc.).

Still referring to FIG. 6, the fluid processing system 606 is adapted for changing or refining raw materials to create end products. It will be apparent to one skilled in the art that aspects of the present disclosure are capable of optimizing processes and processing systems other than fluid processing system 606 and that system 606 is presented for illustration purposes only. Additional exemplary processes include, but are not limited to, those in the chemical, oil and gas, food and beverage, pharmaceutical, water treatment, and electrical power industries. For example, processes may include conveyers, power distribution systems, and/or processes or operations that cannot be interrupted. In an embodiment, process controllers 608 provide an interface or gateway between components of fluid processing system 606 (e.g., valves 612, sensors 614, pump 616) and other components of system 600. In another embodiment, components of fluid processing system 606 communicate directly with system and process 100 via communications infrastructure 204. In yet another embodiment, process controllers 608 transmit data to and receive data from historian system 100, valves 612, sensors 614, and/or pump 616 for controlling and/or monitoring various aspects of fluid processing system 606. The processor controllers 608 and/or sensors 614 comprise the data collectors 104 in accordance with one or more aspects of the present disclosure.

The process controllers 608 of FIG. 6 are adapted to control and/or monitor aspects of fluid processing system 606. In an embodiment, processor controllers 608 are programmable logic controllers (PLC) that control and collect data from aspects of fluid processing system 606. In another embodiment, process controllers 608 are adapted to execute real-time applications that receive configuration data values and real-time data values from historian system 100 and transmit real-time data values (e.g., time-series data values) to historian system 100, as further described herein.

Figure 7:
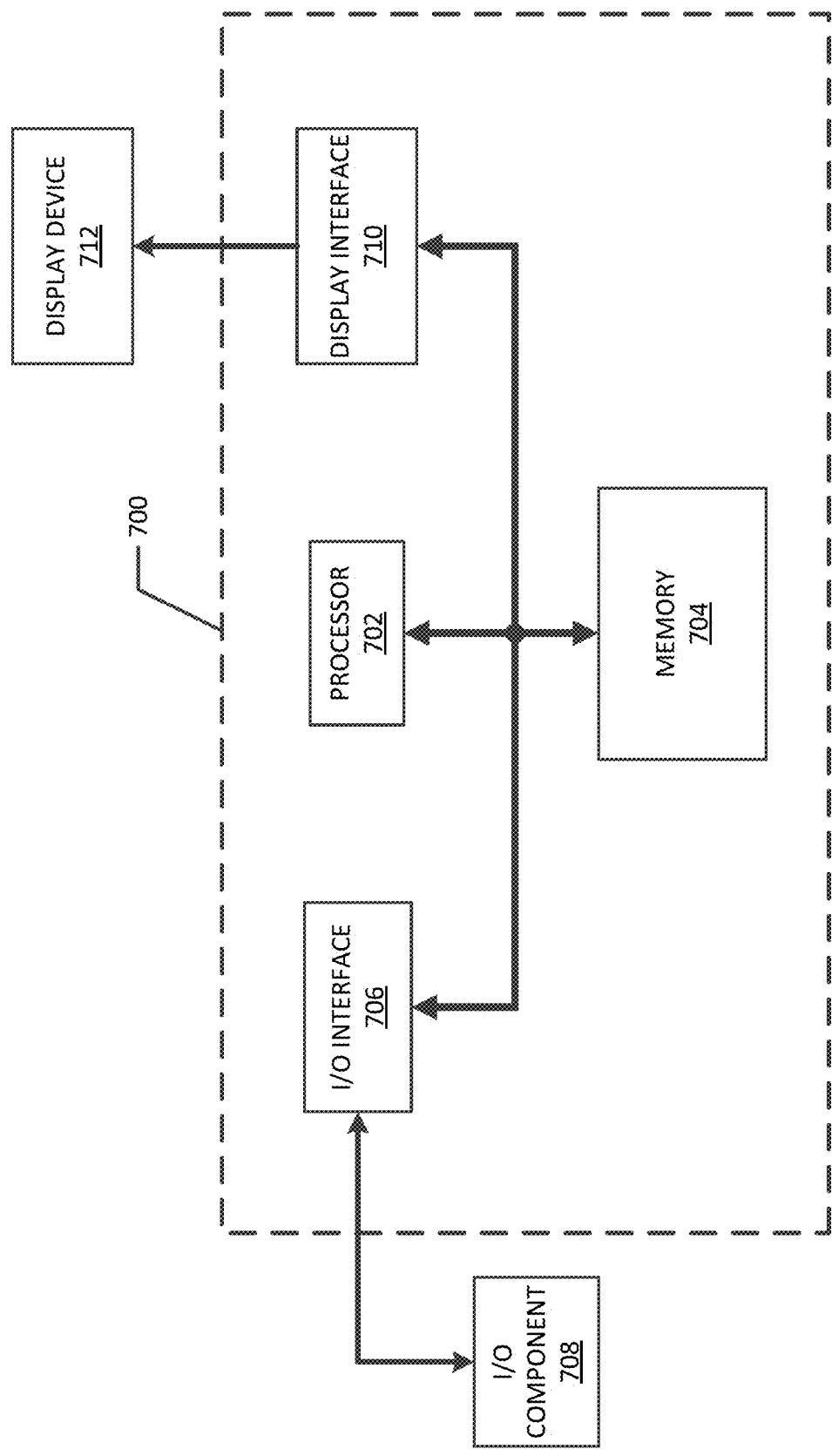
FIG. 7 is a block diagram of an exemplary computing device architecture within which aspects of the disclosure are implemented according to an embodiment.

FIG. 7 illustrates an exemplary architecture of a computing device 700 (e.g., user computing devices 106, historian server computing device 202, etc.) programmed to provide aspects of the systems and processes described herein via a software environment. In this embodiment, the computing device 700 includes a processor 702, a memory 704, an input/output (I/O) interface 706 that interfaces with an I/O component 708, and display interface 710. In an embodiment, the memory 704 includes storage accounts 108 and the applications and data each embodied in processor-executable instructions for executing by processor 702. In this manner, the computing device 700 comprises a special-purpose computing device for associating comments 115 with tag values in a managed historian of distributed historian system 100 in accordance with an aspect of the disclosure.

The processor 702, memory 704, I/O interface 706, and display interface 710 are communicatively connected and/or electrically connected to each other. The I/O interface 706 is communicatively and/or electrically connected to the I/O component 708. The processor 702 is adapted to execute processor-executable instructions stored in the memory 704 for associating comments 115 with tag values in a managed historian of distributed historian system 100. The I/O interface 706 of FIG. 7 provides a physical data connection between the computing device 700 and I/O component 708. In an embodiment, I/O interface 706 is a network interface card (NIC) or modem and I/O component 708 is a telecommunications network (e.g., communications network 204). The display interface 710 provides a physical data connection between computing device 700 and a display device 712. In an embodiment, display device 712 is a touchscreen of a smartphone, tablet computing device, or the like.

In an aspect, a managed historian of a distributed historian system (e.g., distributed historian system 100) includes at least one historian processor (e.g., processor 702), a database storage account (e.g., database 132 within storage account 108), and at least one computer-readable storage medium (e.g., memory 704). The historian processor is communicatively coupled, via a communications network (e.g., communications network 204), to the database storage account, the computer-readable medium, one or more data collectors (e.g., data collectors 104) within a continuous process (e.g., fluid processing system 606), and one or more user computing devices (e.g., user computing devices 106). The database storage account stores process tags that teach represent an attribute of the continuous process with a value that is variable over a time range. Exemplary and non-limiting attributes include physical properties of valves, sensors, pumps, tanks, and the like within the continuous process. The computer-readable storage medium stores processor-executable instructions that, when executed by the historian processor, instantiate a worker role instance (e.g., metadata server worker role instances 128, retrieval worker role instances 130). The executing worker role instance is configured to receive a comment (e.g., comments 115) describing the value of at least one tag of the plurality of tags at a particular time within the time range of the tag. The worker role instance receives the comment from a first user computing device of the one or more user computing devices while the tag is displayed on the first user computing device. The executing worker role instance is further configured to associate the received comment with the tag at the particular time and store the received comment in a flexible data structure (e.g., a partition 304 of container 302) in the database storage account. In this manner, the managed historian stores the comment such that it is provided in association with the tag at the particular time in response to a display request for the tag from the one or more user computing devices.

In another aspect, the present disclosure provides a computer-implemented method of automatically associating comments with tags in a managed historian of a distributed historian system. The method includes a worker role instance receiving from a user computing device a comment describing a value of a process tag at a time within a time range selected via the user computing device. The worker role instance executes on a historian processor that is communicatively coupled to the user computing device via a communications network. The process tag represents an attribute of a continuous process and the value of the process tag is variable over the time range. The worker role instance associates the received comment with the process tag at the selected time and stores the received comment in a flexible data structure of a database that is communicatively coupled to the historian processor. The method further includes providing, by the worker role instance, the comment in association with the tag at the selected time in response to a display request for the tag from the user computing device.

In one form, the worker role instance receives the comment via a REST interface. In another form, the received comment is stored in a container (e.g., container 302) of the database storage account that spans one or more physical partitions (e.g., partitions 304) that are each allocated to a tenant identifier within the managed historian. In yet another form, the comment includes a partition key such that the database stores the comment in one of the physical partitions based on a hash of the partition key of the comment. In another form, the received comment is stored in the same physical partition as other comments having the same hashed partition key. In yet another form, the comment includes a hashtag value (e.g., hashtag value 502) such that the comment is provided in response to a search request for the hashtag value from the one or more user computing devices. In another form, the comment includes at least one of a textual description, a hyperlink to another tag, an attachment, and an image. In yet another form, the comment is private to the first user computing device (i.e., the user computing device from which the comment was received). In another form, the comment is shared with at least a second user computing device based on a location security of the tag associated with the comment. In yet another form, the comment is editable by the first user computing device and the at least second user computing device.

In another form, a system includes a first user computing device (e.g., a first user computing device 106), a second user computing device (e.g., a different user computing device 106), one or more data collectors (e.g., data collectors 104) within a continuous process (e.g., fluid processing system 606), a database storage account (e.g., database 132 within storage account 108), and a distributed historian system (e.g., distributed historian system 100). The database storage account stores process tags that each represent an attribute of the continuous process. Each tag has a value that is variable over a time range. The distributed historian system is communicatively coupled, via a communications network (e.g., communications network 204), to the first and second user computing devices, the data collectors, and the database storage account. The distributed historian system includes a worker role instance (e.g., metadata server worker role instances 128, retrieval worker role instances 130). The worker role instance is configured to receive a comment (e.g., comments 115) from the first user computing device that describes the value of at least one tag of the plurality of tags at a particular time within the time range of the tag. The worker role instance receives the comment from the first user computing device while the tag is displayed on the first user computing device. The worker role instance is further configured to associate the received comment with the tag at the particular time and store the received comment in a flexible data structure (e.g., a partition 304 of container 302) in the database storage account. The worker role instance further shares access to the stored comment with the second user computing device based on a location security of the process tag associated with the comment. And the worker role instance provides the shared comment in association with the tag at the particular time in response to a display request for the tag from the second user computing device.

Embodiments of the present disclosure may comprise a special purpose computer including a variety of computer hardware, as described in greater detail below.

Embodiments within the scope of the present disclosure also include computer-readable media for carrying or having computer-executable instructions or data structures stored thereon. Such computer-readable media can be any available media that can be accessed by a special purpose computer. By way of example, and not limitation, such computer-readable media can comprise RAM, ROM, EEPROM, CD-ROM or other optical disk storage, magnetic disk storage, or other magnetic storage devices, or any other medium that can be used to carry or store desired program code means in the form of computer-executable instructions or data structures and that can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

The following discussion is intended to provide a brief, general description of a suitable computing environment in which aspects of the disclosure may be implemented. Although not required, aspects of the disclosure will be described in the general context of computer-executable instructions, such as program modules, being executed by computers in network environments. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represent examples of corresponding acts for implementing the functions described in such steps.

Those skilled in the art will appreciate that aspects of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Aspects of the disclosure may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing aspects of the disclosure includes a special purpose computing device in the form of a conventional computer, including a processing unit, a system memory, and a system bus that couples various system components including the system memory to the processing unit. The system bus may be any of several types of bus structures including a memory bus or memory controller, a peripheral bus, and a local bus using any of a variety of bus architectures. The system memory includes read only memory (ROM) and random access memory (RAM). A basic input/output system (BIOS), containing the basic routines that help transfer information between elements within the computer, such as during start-up, may be stored in ROM. Further, the computer may include any device (e.g., computer, laptop, tablet, PDA, cell phone, mobile phone, a smart television, and the like) that is capable of receiving or transmitting an IP address wirelessly to or from the internet.

The computer may also include a magnetic hard disk drive for reading from and writing to a magnetic hard disk, a magnetic disk drive for reading from or writing to a removable magnetic disk, and an optical disk drive for reading from or writing to removable optical disk such as a CD-ROM or other optical media. The magnetic hard disk drive, magnetic disk drive, and optical disk drive are connected to the system bus by a hard disk drive interface, a magnetic disk drive-interface, and an optical drive interface, respectively. The drives and their associated computer-readable media provide nonvolatile storage of computer-executable instructions, data structures, program modules, and other data for the computer. Although the exemplary environment described herein employs a magnetic hard disk, a removable magnetic disk, and a removable optical disk, other types of computer readable media for storing data can be used, including magnetic cassettes, flash memory cards, digital video disks, Bernoulli cartridges, RAMs, ROMs, solid state drives (SSDs), and the like.

The computer typically includes a variety of computer readable media. Computer readable media can be any available media that can be accessed by the computer and includes both volatile and nonvolatile media, removable and non-removable media. By way of example, and not limitation, computer readable media may comprise computer storage media and communication media. Computer storage media include both volatile and nonvolatile, removable and non-removable media implemented in any method or technology for storage of information such as computer readable instructions, data structures, program modules or other data. Computer storage media are non-transitory and include, but are not limited to, RAM, ROM, EEPROM, flash memory or other memory technology, CD-ROM, digital versatile disks (DVD) or other optical disk storage, SSDs, magnetic cassettes, magnetic tape, magnetic disk storage or other magnetic storage devices, or any other medium which can be used to store the desired non-transitory information, which can accessed by the computer.

Alternatively, communication media typically embody computer readable instructions, data structures, program modules or other data in a modulated data signal such as a carrier wave or other transport mechanism and includes any information delivery media.

Program code means comprising one or more program modules may be stored on the hard disk, magnetic disk, optical disk, ROM, and/or RAM, including an operating system, one or more application programs, other program modules, and program data. A user may enter commands and information into the computer through a keyboard, pointing device, or other input device, such as a microphone, joy stick, game pad, satellite dish, scanner, or the like. These and other input devices are often connected to the processing unit through a serial port interface coupled to the system bus. Alternatively, the input devices may be connected by other interfaces, such as a parallel port, a game port, or a universal serial bus (USB). A monitor or another display device is also connected to the system bus via an interface, such as video adapter 48. In addition to the monitor, personal computers typically include other peripheral output devices (not shown), such as speakers and printers.

One or more aspects of the disclosure may be embodied in computer-executable instructions (i.e., software), routines, or functions stored in system memory or non-volatile memory as application programs, program modules, and/or program data. The software may alternatively be stored remotely, such as on a remote computer with remote application programs. Generally, program modules include routines, programs, objects, components, data structures, etc. that perform particular tasks or implement particular abstract data types when executed by a processor in a computer or other device. The computer executable instructions may be stored on one or more tangible, non-transitory computer readable media (e.g., hard disk, optical disk, removable storage media, solid state memory, RAM, etc.) and executed by one or more processors or other devices. As will be appreciated by one of skill in the art, the functionality of the program modules may be combined or distributed as desired in various embodiments. In addition, the functionality may be embodied in whole or in part in firmware or hardware equivalents such as integrated circuits, application specific integrated circuits, field programmable gate arrays (FPGA), and the like.

The computer may operate in a networked environment using logical connections to one or more remote computers. The remote computers may each be another personal computer, a tablet, a PDA, a server, a router, a network PC, a peer device, or other common network node, and typically include many or all of the elements described above relative to the computer. The logical connections include a local area network (LAN) and a wide area network (WAN) that are presented here by way of example and not limitation. Such networking environments are commonplace in office-wide or enterprise-wide computer networks, intranets and the Internet.

When used in a LAN networking environment, the computer is connected to the local network through a network interface or adapter. When used in a WAN networking environment, the computer may include a modem, a wireless link, or other means for establishing communications over the wide area network, such as the Internet. The modem, which may be internal or external, is connected to the system bus via the serial port interface. In a networked environment, program modules depicted relative to the computer, or portions thereof, may be stored in the remote memory storage device. It will be appreciated that the network connections shown are exemplary and other means of establishing communications over wide area network may be used.

Preferably, computer-executable instructions are stored in a memory, such as the hard disk drive, and executed by the computer. Advantageously, the computer processor has the capability to perform all operations (e.g., execute computer-executable instructions) in real-time.

The order of execution or performance of the operations in embodiments illustrated and described herein is not essential, unless otherwise specified. That is, the operations may be performed in any order, unless otherwise specified, and embodiments may include additional or fewer operations than those disclosed herein. For example, it is contemplated that executing or performing a particular operation before, contemporaneously with, or after another operation is within the scope of aspects of the disclosure.

Embodiments may be implemented with computer-executable instructions. The computer-executable instructions may be organized into one or more computer-executable components or modules. Aspects of the disclosure may be implemented with any number and organization of such components or modules. For example, aspects of the disclosure are not limited to the specific computer-executable instructions or the specific components or modules illustrated in the figures and described herein. Other embodiments may include different computer-executable instructions or components having more or less functionality than illustrated and described herein.

When introducing elements of aspects of the disclosure or the embodiments thereof, the articles "a", "an", "the" and "said" are intended to mean that there are one or more of the elements. The terms "comprising", "including", and "having" are intended to be inclusive and mean that there may be additional elements other than the listed elements.

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A system for automatically associating comments with process tags comprising:
a historian system comprising one or more processors and one or more non-transitory computer readable media, the one or more non-transitory computer readable media including instructions stored thereon that when executed cause the historian system to:
store, by the one or more processors, tag data received from a sensor in a first database, the tag data including location security information;
display, by the one or more processors, a graphical user interface (GUI) comprising a chart, the chart including a visual representation of the tag data over a time range received from a sensor;
enable, by the one or more processors, a selection of the visual representation of the tag data at a particular time within the time range displayed on the GUI;
display, by the one or more processors, a comment addition interface on the GUI in response to the selection of the visual representation of the tag data at the particular time;
enable, by the one or more processors, entry of a comment associated with the tag data and entry of a security setting associated with the comment in the comment addition interface;
store, by the one or more processors, the comment and the security setting associated with the comment in a second database; and
associate, by the one or more processors, the tag data stored in the first database with the comment stored in the second database, the association of the tag data and the comment causing the visual representation of the tag data at the particular time to be automatically updated to include an indication of the comment, the automatic update occurring in response to a request to display the tag data and based on the location security information included in the tag data and the security setting associated with the comment.

2. The system of claim 1,
wherein the comment is provided in association with the tag data in response to a search request for the tag data.

3. The system of claim 1,
wherein the comment stored in the second database is associated with the time range of the tag data.

4. The system of claim 3,
wherein the comment is provided in association with the time range in response to a search request for the time range.

5. The system of claim 3,
wherein the comment stored in the second database is associated with the particular time within the time range of the tag data.

6. The system of claim 5,
wherein the comment is provided in association with the particular time in response to a search request for the time.

7. The system of claim 5,
wherein the comment includes one or more of user feedback, opinions, reactions, observations, reasons, commentary, explanations, annotations, hashtags, hyperlinks, and attachments.

8. The system of claim 2,
wherein the comment includes at least one of a textual description, a hyperlink to another tag, an attachment, and an image.

9. A system for automatically associating comments with time-series data located in separate databases comprising:
a historian system,
a storage worker role instance,
a retrieval worker role instance, and
a computing device;
wherein the historian system comprises one or more computers comprising one or more processors and one or more non-transitory computer readable media, the one or more non-transitory computer readable media including instructions stored thereon that when executed cause the historian system to:
receive, by the storage worker role instance, time-series data collected from a process tag associated with one or more sensors, the process tag including location security information;
store, by the storage worker role instance, the time-series data in a first database;
display, by the one or more processors, a graphical user interface (GUI) comprising a chart comprising a visual representation of the time-series data over a time range;
enable, by the one or more processors, a selection of the visual representation of the time-series data at a selected time within the time range;
display, by the one or more processors, a comment addition interface on the GUI in response to the selection of the visual representation of the time-series data at the selected time on the chart;
enable, by the one or more processors, entry of a comment associated with the time series data and entry of a security setting associated with the comment in the comment addition interface;
receive, via the retrieval worker role instance, the one or more comments associated with the selected time within the time-series data;
associate, via the retrieval worker role instance, the one or more comments with the selected time;
store, via the retrieval worker role instance, the one or more comments and the security setting associated with the one or more comments in a second database; and
provide, by the retrieval worker role instance, the one or more comments in association with the selected time in response to a request for the time-series data from the computing device and based on the location security information included in the tag data and the security setting associated with the comment.

10. The system of claim 9,
wherein the one or more comments includes a hashtag value; and
wherein the one or more comments are provided in response to a search request for the hashtag value from the computing device.

11. The system of claim 9,
wherein the retrieval worker role instance receives the one or more comments via a representational state transfer (REST) interface.

12. The system of claim 9,
wherein the first database and the second database are each a partition within at least one database storage account.

13. The system of claim 12,
wherein each partition is allocated to a tenant identifier within the historian system.

14. The system of claim 12,
wherein the one or more comments includes a partition key; and
wherein the second database stores the one or more comments in one of each partition based on a partition key hash.

15. The system of claim 14,
wherein the one or more comments are stored in a same partition as other comments having a same partition key hash.

16. The system of claim 9,
wherein the one or more comments are shared with a second computing device based on a location security associated with the one or more comments.

17. The system of claim 9,
wherein the one or more comments includes one or more of user feedback, opinions, reactions, observations, reasons, commentary, explanations, annotations, hashtags, hyperlinks, and attachments.

* * * * *